US010950871B2

(12) United States Patent
Chopra et al.

(10) Patent No.: US 10,950,871 B2
(45) Date of Patent: Mar. 16, 2021

(54) FLEXIBLE THIN-FILM PRINTED BATTERIES WITH 3D PRINTED SUBSTRATES

(71) Applicant: Xerox Corporation, Norwalk, CT (US)

(72) Inventors: Naveen Chopra, Oakville (CA); Gregory McGuire, Oakville (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 74 days.

(21) Appl. No.: 16/409,498

(22) Filed: May 10, 2019

(65) Prior Publication Data

US 2020/0358109 A1    Nov. 12, 2020

(51) Int. Cl.
*H01M 6/40* (2006.01)
*H01M 2/16* (2006.01)
*H01M 10/0585* (2010.01)

(52) U.S. Cl.
CPC ............. *H01M 6/40* (2013.01); *H01M 2/162* (2013.01); *H01M 10/0585* (2013.01); *H01M 2220/30* (2013.01)

(58) Field of Classification Search
None
See application file for complete search history.

(56) References Cited

U.S. PATENT DOCUMENTS

| 2012/0276434 A1 | 11/2012 | Gaikwad et al. |
| 2014/0248524 A1* | 9/2014 | Wang ...................... H01M 6/40 429/124 |

\* cited by examiner

*Primary Examiner* — Daniel S Gatewood

(57) ABSTRACT

A method for printing a flexible printed battery is disclosed. For example, the method includes printing, via a three-dimensional (3D) printer, a first substrate of the flexible thin-film printed battery, printing a first current collector on the first substrate, printing a first layer on the first current collector, printing, via the 3D printer, a second substrate, printing a second current collector on the second substrate, printing a second layer on the second current collector, and coupling the first substrate and the second substrate around a paper separator membrane moistened with an electrolyte that is in contact with the first layer and the second layer.

10 Claims, 6 Drawing Sheets

FLEXIBLE THIN-FILM PRINTED BATTERIES WITH 3D PRINTED SUBSTRATES

The present disclosure relates generally to batteries and relates more particularly to flexible thin-film printed batteries with 3D printed substrates.

BACKGROUND

The continuous evolution of size, shape, and form factor of portable electronic devices has led to new battery designs and capabilities. People use portable electronic devices for a variety of different activities from cell phones, to adding electronics to textiles, to portable computing devices, and the like. As technology advances, the size of devices continues to shrink along with the size of the batteries powering these electronic devices.

SUMMARY

According to aspects illustrated herein, there are provided a method, non-transitory computer readable medium, and apparatus for printing a flexible printed battery. One disclosed feature of the embodiments is a method comprising printing, via a three-dimensional (3D) printer, a first substrate of the flexible thin-film printed battery, printing a first current collector on the first substrate, printing a first layer on the first current collector, printing, via the 3D printer, a second substrate, printing a second current collector on the second substrate, printing a second layer on the second current collector, and coupling the first substrate and the second substrate around a paper separator membrane moistened with an electrolyte that is in contact with the first layer and the second layer.

Another disclosed feature of the embodiments is a flexible printed battery. The flexible printed battery comprises a first substrate that is three dimensionally (3D) printed, a first current collector on the first substrate, a first layer on the first current collector, a second substrate that is 3D printed, a second current collector on the second substrate, a second layer on the second current collector, and a paper separator membrane moistened with an electrolyte, wherein the first substrate and the second substrate are coupled around the paper separator membrane such that the separator membrane is in contact with the first layer and the second layer.

Another disclosed feature of the embodiments is a non-transitory computer readable medium storing a plurality of instructions, which when executed by a processor, causes the processor to perform operations. The operations include printing a first substrate of the flexible printed battery, printing a first current collector on the first substrate, printing the first layer on the first current collector, printing a second substrate, printing the second current collector on the second substrate, and printing the second layer on the second current collector, wherein the first substrate and the second substrate are coupled around a paper separator membrane moistened with an electrolyte that is in contact with the first layer and the second layer.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure is related to a method for printing a flexible printed battery with a 3D printed substrate. As discussed above, the continuous evolution of size, shape, and form factor of portable electronic devices has led to new battery designs and capabilities. Further advances in designs of the electronic devices has led to flexible battery powered electronic devices.

Currently available flexible batteries are printed on plastic substrates. However, when a flat plastic substrate is applied to certain surfaces, the flexible battery may not adhere smoothly or well to the surface. For example, a printed object may have a curved or irregular surface. An existing flexible battery on a plastic substrate may have bubbles, wrinkles, or in general not adhere smoothly, across a curved or irregular surface.

In addition, the plastic substrates may require the use of an adhesive or an encapsulant to be coupled together to form the flexible battery. The adhesive may add costs, possibly leak into the battery causing a malfunction, and the like.

Embodiments of the present disclosure provide a flexible printed battery with a 3D printed substrate. In other words, the entire battery can be printed including the substrate that is 3D printed. As a result, the substrate may be printed to adhere smoothly to a curved or an irregular surface. For example, the substrate can be printed to any shape, form, size, dimension, texture, and the like, to match the surface of the object. In some examples, the substrate may be printed as an integral part of the 3D object that is being printed.

In addition, the 3D printed substrate may eliminate the need for an adhesive or an encapsulant. Rather, the substrate of each half of the battery may be coupled via a thermal bonding process. The thermal bonding may heat the edges of the substrate to seal the battery.

Figure 1:
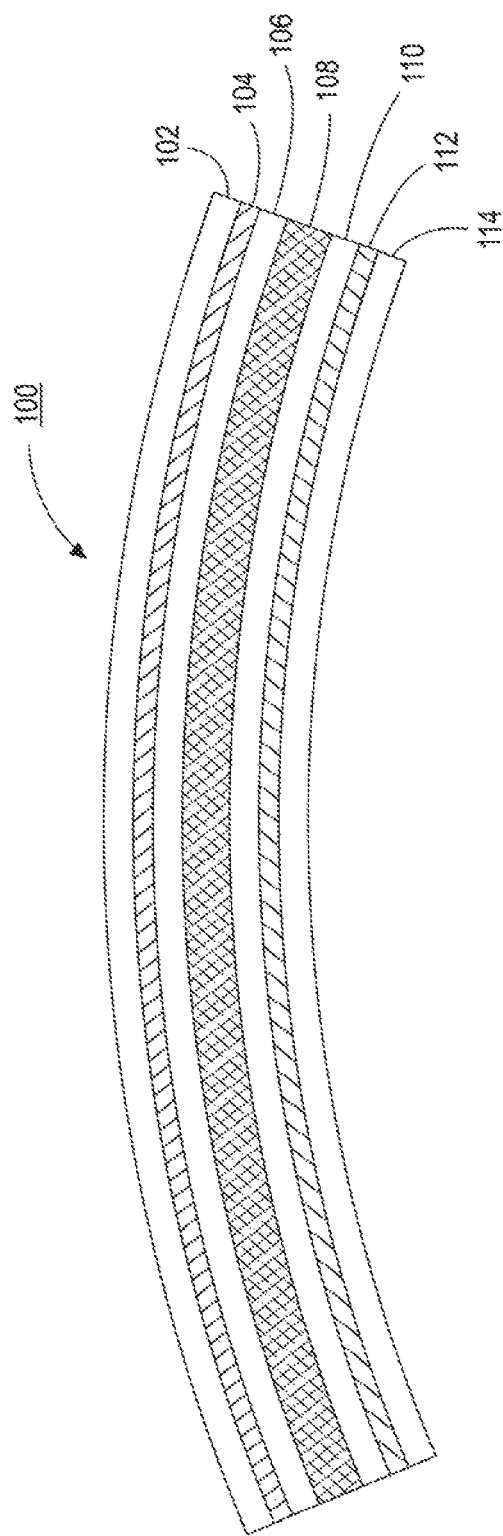
FIG. 1 illustrates a cross-sectional block diagram of an example flexible printed battery with a three-dimensional (3D) printed substrate of the present disclosure.

FIG. 1 illustrates a cross-sectional block diagram of an example flexible printed battery with a 3D printed substrate 100 (also referred to herein as the battery 100). In some embodiments, the flexible printed battery may be a thin-film battery.

In one embodiment, "flexible" may be defined to mean that the shape of the battery can be modified without breaking. For example, the battery may be able to bend, twist, fold, roll, and the like. In one embodiment, the battery may be flexible such that the battery may be able to bend, twist, fold, roll, and the like, without maintaining the manipulated shape. In one embodiment, the battery may be flexible such that the battery may be able to bend, twist, fold, roll, and the like, such that the manipulated shape is maintained.

It should be noted that the battery 100 and each layer of the battery 100 is not drawn to scale in FIG. 1. For example, each layer may be drawn thicker such that each layer can be easily seen for ease of explanation.

In one embodiment, the battery 100 may include a cathode substrate 102, a cathode current collector 104, a cathode layer 106, a paper separator membrane 108, an anode layer 110, an anode current collector 112, and an anode substrate 114. In one embodiment, the cathode substrate 102 and the anode substrate 114 may be fabricated via a 3D printer. Unlike other printed or flexible batteries that use a flat plastic substrate, the present disclosure prints the cathode substrate 102 and the anode substrate 114 along with the rest of the thin-film flexible battery.

Printing the cathode substrate 102 and the anode substrate 114 may allow the battery 100 to have any shape, surface, contour, texture, and the like, that matches an outer surface of a 3D printed object. Thus, the cathode substrate 102 and the anode substrate 114 may be created digitally on demand for any type of 3D printed object or shape used for an electronic device. For example, the 3D printed object may have a curved or convex outer surface. The previous flexible battery designs that use a flat plastic substrate may create bubbles or wrinkles as the flat plastic substrate is coupled to the curved outer surface of the 3D printed object.

In contrast, the present disclosure provides a 3D printed cathode substrate 102 and anode substrate 114 that can be printed to match the shape of the curved or convex outer surface of the 3D printed object. If the 3D printed object includes bumps, irregular shapes, a textured surface, and the like, the cathode substrate 102 and/or the anode substrate 114 can be printed to have a perfectly matching surface that correspond with the bumps, irregular shapes, the textures surface, and the like.

In one example, the cathode substrate 102 and/or the anode substrate 114 may be printed as part of the 3D printed object, as discussed in further details below. In other words, the cathode substrate 102 and/or the anode substrate 114 may be printed as an integral part of the 3D printed object. Said another way the cathode substrate 102 and/or the anode substrate 114 and the 3D printed object may be printed as a single piece.

In addition, by printing the cathode substrate 102 and the anode substrate 114, the substrates can be thermally bonded without the use of adhesives or encapsulants. For example, heat can be applied to the edges of the cathode substrate 102 and the anode substrate 114 to melt and seal the edges of the battery 100 without using any adhesives or encapsulants.

In one embodiment, the cathode substrate 102 and the anode substrate 114 may be printed in a 3D printer using any type of materials that are compatible with thin-film flexible batteries. For example, the cathode substrate 102 and the anode substrate 114 may be printed using material such as Ninjaflex. Ninjaflex is a very flexible and tough grade of thermoplastic polyurethane (TPU), commercially available from NinjaTek. Other flexible 3D printed polymers from the general class of thermoplastic elastomers (TPE) or TPU's may also be used. Examples of materials may include polyester copolyamide thermoplastic elastomers (PCTPE), soft polylactic acid (PLA) (e.g., PLA that has been saturated in a specific chemical to soften it), and the like.

In one embodiment, the cathode current collector 104 may be printed onto the cathode substrate 102. The anode current collector 112 may be printed onto the anode substrate 114. The cathode current collector 104 and the anode current collector 112 may be printed using silver (Ag).

In one embodiment, the cathode layer 106 may be printed onto the cathode current collector 104. The anode layer 110 may be printed onto the anode current collector 112. In one embodiment, the cathode layer 106 may be printed using manganese oxide ($MnO_2$) and the anode layer 110 may be printed using zinc (Zn).

In one embodiment, the cathode current collector 104, the cathode layer 106, the anode layer 110, and the anode current collector 112 may be printed using any available printing method. In one embodiment, the cathode current collector 104, the cathode layer 106, the anode layer 110, and the anode current collector 112 may be screen printed. In another embodiment, the cathode current collector 104, the cathode layer 106, the anode layer 110, and the anode current collector 112 may be 3D printed when metals are provided in a form capable of 3D printing.

In one embodiment, the cathode portion (e.g., the cathode substrate 102, the cathode current collector 104, and the cathode layer 106) may be coupled to the anode portion (e.g., the anode substrate 114, the anode current collector 112, and the anode layer 110) around the paper separator membrane 108. In other words, the paper separator membrane 108 may be located between the cathode layer 106 and the anode layer 110. The paper separator membrane 108 may be a paper material that is moistened with an electrolyte. In one embodiment, the electrolyte may be ammonium chloride ($NH_4Cl$).

Figure 2:
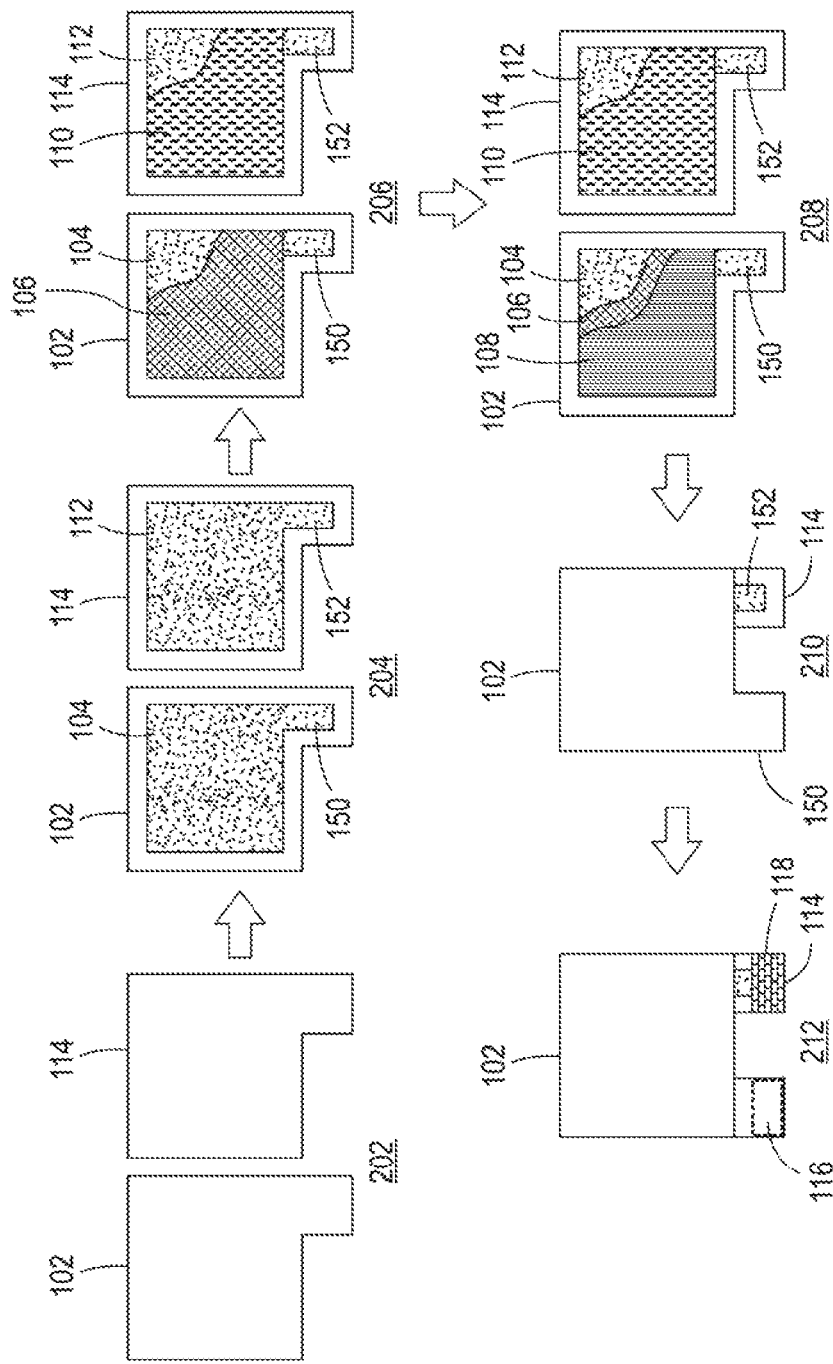
FIG. 2 illustrates a process flow diagram an assembly of the flexible printed battery with the 3D printed substrate of the present disclosure.

FIG. 2 illustrates an example of a process flow 200 for fabricating the battery 100. In one embodiment, at block 202 the cathode substrate 102 and the anode substrate 114 may be printed. As noted above, and discussed in further details below, the cathode substrate 102 and/or the anode substrate 114 may be printed as part of a 3D printed object. Although the cathode substrate 102 and the anode substrate 114 are illustrated as being flat in FIG. 2, it should be noted that the cathode substrate 102 and the anode substrate 114 can be 3D printed to have any shape that is substantially similar to an outer surface of a 3D printed object (e.g., a curved or convex surface), as noted above.

The cathode substrate 102 and the anode substrate 114 may be printed to have a substantially similar shape. For example, if the cathode substrate 102 is printed as a convex curve, the anode substrate 114 may also be printed as a convex curve that has an equal amount of curvature as the cathode substrate 102.

At block 204, the cathode current collector 104 may be printed onto the cathode substrate 102 and the anode current collector 112 may be printed onto the anode substrate 114. In one embodiment, the cathode current collector 104 and the anode current collector may be printed to include a tab portion 150 and 152, respectively, to which a connection can be made. In one embodiment, the cathode current collector 104 and the anode current collector 112 may be printed with a silver.

At block 206, the cathode layer 106 may be printed onto the cathode current collector 104 and the anode layer 110 can be printed onto the anode current collector 112. The tab 150 of the current collector 104 and the tab 152 of the anode current collector 112 may be visible. The cathode layer 106 may be printed using $MnO_2$ and the anode layer 110 may be printed using Zn.

At block 208, the paper separator membrane 108 may be applied on the cathode layer 106. In one embodiment, the paper separator membrane 108 may be applied to the anode layer 110 instead of the cathode layer 106. The paper separator membrane 108 may be moistened with an electrolyte. In one embodiment, the electrolyte may be $NH_4Cl$.

At block 210, the cathode portion (e.g., the cathode substrate 102, the cathode current collector 104, the cathode layer 106, and the paper separator membrane 108) may be coupled to the anode portion (e.g., the anode substrate 114, the anode current collector 112, and the anode layer 110). Block 210 illustrates the tab portion 152 of the anode current collector 112 that is still visible. The tab portion 150 of the cathode current collector 104 may be also exposed, but facing down (e.g., hidden when viewing from above as illustrated in block 210).

In one embodiment, the cathode substrate 102 may be thermally bonded to the anode substrate 114 to seal the battery 100. For example, a thermal bonding process that applies heat to the edges or the perimeter of the cathode substrate 102 and the anode substrate 114 may be carried out to seal the battery 100. Notably, no adhesives or encapsulants are needed to bond the cathode substrate 102 to the anode substrate 114.

At block 212 a conductive material 116 and 118 may be used to cover the tab portion 150 of the cathode current collector 104 and the tab portion 152 of the anode current collector 112, respectively. The conductive material 116 and 118 may be metallic foil. In one embodiment, the conductive material 116 and 118 may be copper foil. The conductive material 116 for the tab portion 150 of the cathode current collector 104 may be hidden from view in the block 212, but is shown as dashed lines in block 212.

Figure 3:
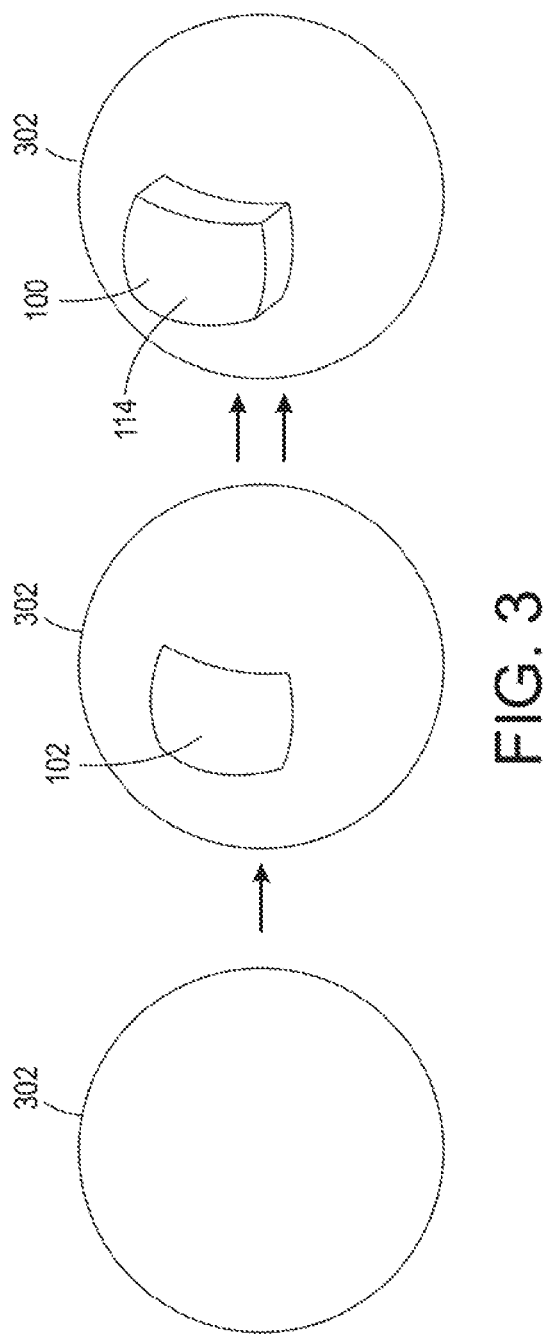
FIG. 3 illustrates an example of a 3D printed object with an integrated 3D printed substrate of the flexible printed battery 3D printed of the present disclosure.

FIG. 3 illustrates an example of a 3D printed object 302. In one example, the 3D printed object 302 may be printed layer by layer in an additive printing process. For example, any type of 3D printing process can be used such as fused deposition modeling (FDM), selective laser sintering (SLS), selective laser melting (SLM), binder jetting, and the like.

In one embodiment, the cathode substrate 102 may be printed as an integral part of the 3D object 302. In other words, the cathode substrate 102 may be part of the same code or instructions for the 3D printer that is used to print the 3D object 302. Said another way, the cathode substrate 102 and the 3D printed object 302 may be printed as a single unitary piece formed or printed from a single printing process or printing instruction fed to the 3D printer. Although the cathode substrate 102 is shown as being printed as an integral part of the 3D object 302, it should be noted that the anode substrate 114 may also be printed as an integral part of the 3D object 302 rather than the cathode substrate 102.

The anode substrate 114 may be printed to have a similar shape as the cathode substrate 102. The battery 100 may be completed by printing the layers of the battery 100, as described above, and coupling the anode substrate 114 to the cathode substrate 102. As noted above, the anode substrate 114 may be coupled to the cathode substrate 102 without adhesives using a thermal bonding process.

Although FIG. 3 illustrates the 3D printed object 302 as a sphere, it should be noted that the 3D printed object 302 may have any type of shape, curves, series of convex and concave curves, textures on the surface, irregular shapes, and the like. The cathode substrate 102 and/or the anode substrate 114 may be printed to have a substantially similar shape as the outer surface of the 3D printed object 302 including any type of shape, curves, series of convex and concave curves, textures on the surface, irregular shapes, and the like.

Figure 4:
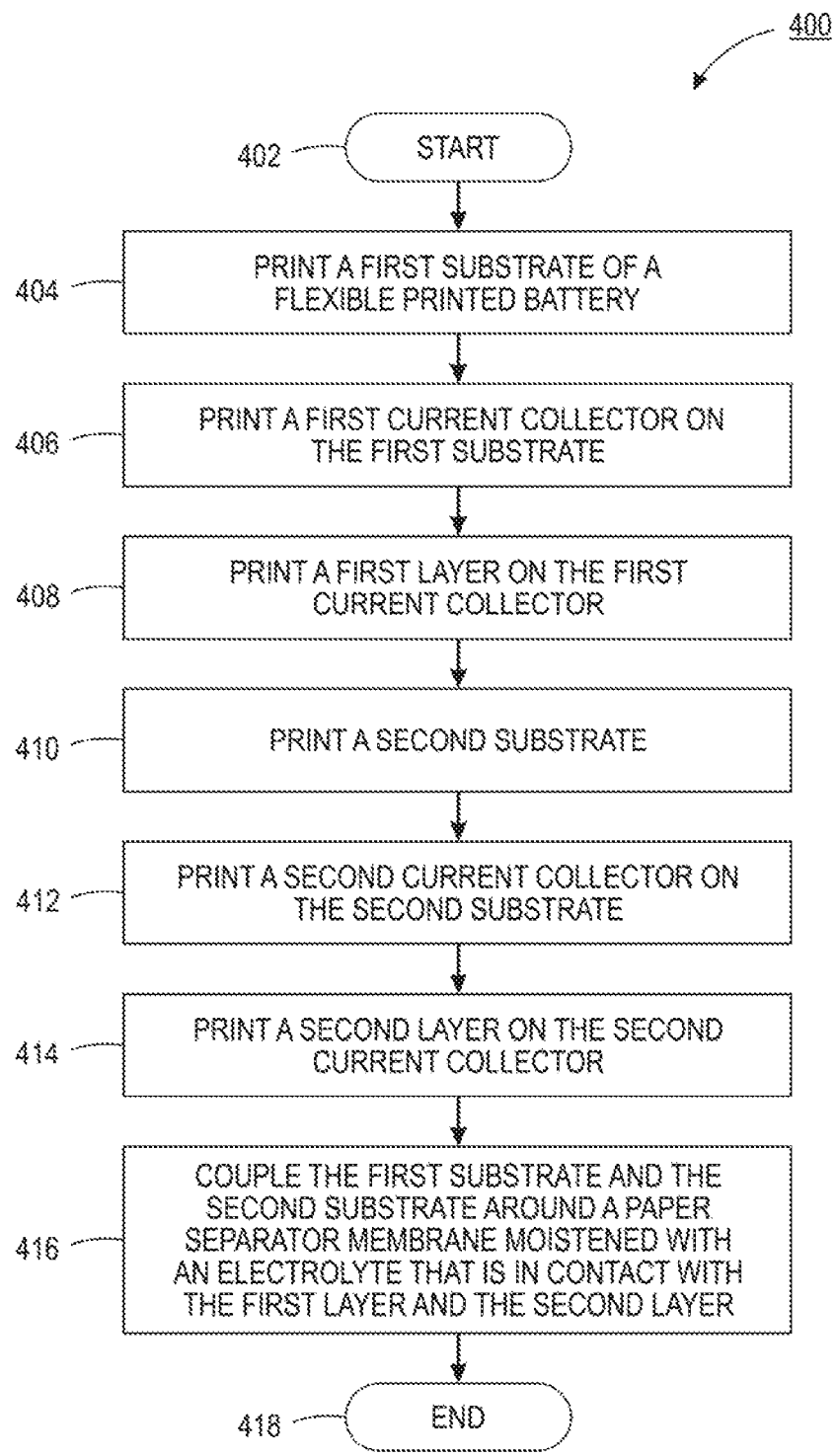
FIG. 4 illustrates a flowchart of an example method for printing a flexible printed battery with the 3D printed substrate of the present disclosure.

FIG. 4 illustrates a flowchart of an example method 400 printing a flexible printed battery with the 3D printed substrate. In one embodiment, one or more steps or operations of the method 400 may be performed by the 3D printer, performed via other printing methods such as screen printing, or a computer 600 illustrated in FIG. 6 and describe below that may control operation of one or more different devices to perform the printing operations (e.g., a 3D printer, a screen printing apparatus, and the like).

At block 402, the method 400 begins. At block 404, the method 400 prints a first substrate of the flexible printed battery. In one embodiment, the first substrate may be 3D printed using any type of material that is suitable or compatible as a substrate for a battery. The first substrate may be printed to have a shape that is substantially similar to an outer surface of a 3D object that is printed. The 3D object may be part of an electronic device that may use the flexible thin-film printed battery having the 3D printed substrate. The shape of the first substrate may be curved, convex, concave, irregular, textured, a series of concave and convex curves or irregular shapes, and the like.

At block 406, the method 400 prints a first current collector on the first substrate. The first current collector may be printed with a tab portion to provide an area for connection to complete a circuit to the battery.

At block 408, the method 400 prints a first layer on the first current collector. The first layer may be printed to substantially cover the first current collector. In one embodiment, the first current collector and the first layer may be printed via a different printing method than the first substrate. For example, the first current collector and the first layer may be printed via a screen printing operation. In another embodiment, the first substrate, the first current collector and the first layer may be printed using the same printing method (e.g., 3D printing).

In one embodiment, the first substrate, the first current collector, and the first layer may be the cathode. When the first substrate, the first current collector, and the first layer are the cathode, the first current collector may be printed using silver and the first layer may be printed using $MnO_2$.

In one embodiment, the first substrate, the first current collector, and the first layer may be the anode. When the first substrate, the first current collector, and the first layer are the anode, the first current collector may be printed using silver and the first layer may be printed using Zn. In other words, either the cathode or the anode may be printed first.

At block 410, the method 400 prints a second substrate. The second substrate may be printed using the same material as the first substrate that is printed. The second substrate and the first substrate may be printed at the same time in a 3D printer. The second substrate may be printed to have a substantially similar shape as the first substrate.

At block 412, the method 400 prints a second current collector on the second substrate. The second current collector may be printed with a tab portion to provide an area for connection to complete a circuit to the battery.

At block, 414, the method 400 prints a second layer on the second current collector. The second layer may be printed to substantially cover the second current collector. In one embodiment, the second current collector and the second layer may be printed via a different printing method than the second substrate. For example, the second current collector and the second layer may be printed via a screen printing operation. In another embodiment, the second substrate, the second current collector and the second layer may be printed using the same printing method (e.g., 3D printing).

In one embodiment, the second substrate, the second current collector, and the second layer may be the anode if the first substrate, the first current collector, and the first layer are the cathode. In one embodiment, the second substrate, the second current collector, and the second layer may be the cathode if the first substrate, the first current collector, and the first layer are the anode.

At block 416, the method 400 couples the first substrate and the second substrate around a paper separator membrane moistened with an electrolyte that is in contact with the first layer and the second layer. For example, the paper separator membrane may be positioned between the first substrate and the second substrate and in contact with the first layer and the second layer. The paper separator membrane may be moistened with an electrolyte such as $NH_4Cl$. However, it should be noted that any electrolyte that can be used for batteries may be used.

In one embodiment, the first substrate and the second substrate may be coupled together without using an adhesive or an encapsulant. For example, the first substrate and the second substrate may be coupled via a thermal bonding process. Heat may be applied around the edges of the first substrate and the second substrate to thermally bond the substrate materials together and form a seal around the perimeter or edges of the first substrate and the second substrate.

In one embodiment, a conductive layer or material may be used to cover the tab portions of the first current collector and the second current collector that may still be exposed. The conductive layer may be any type of metal material such as a copper foil. At block 418, the method 400 ends.

Figure 5:
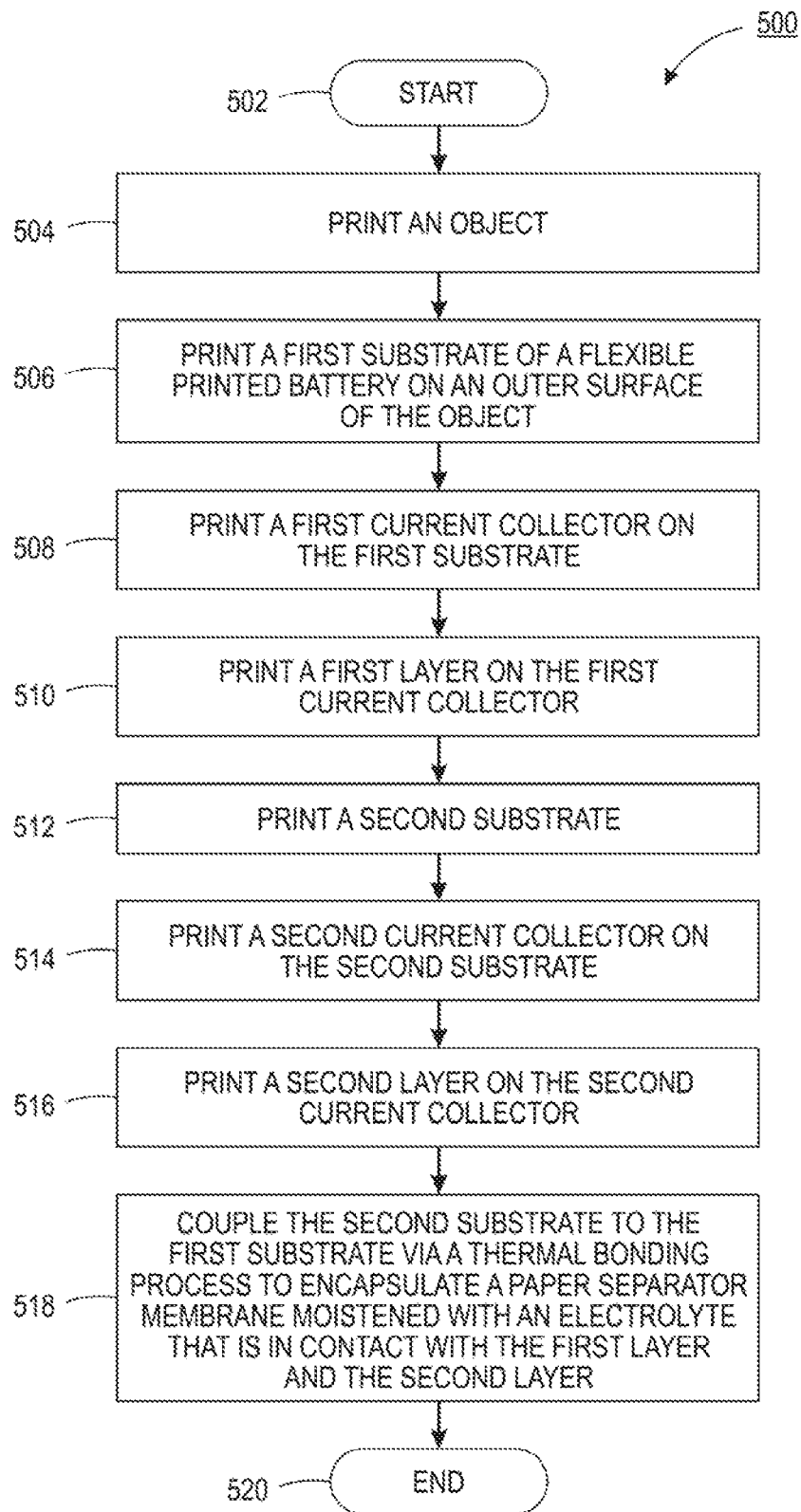
FIG. 5 illustrates a flowchart of an example method for printing a 3D printed object with a 3D printed flexible battery and substrate of the present disclosure.

FIG. 5 illustrates a flowchart of an example method 500 for printing a 3D printed object with a 3D printed flexible battery and substrate. In one embodiment, one or more steps or operations of the method 500 may be performed by the 3D printer, performed via other printing methods such as screen printing, or performed by a computer 600 illustrated in FIG. 6 and described below that may control operation of one or more different devices to perform the printing operations (e.g., a 3D printer, a screen printing apparatus, and the like).

At block 502, the method 500 begins. At block 504, the method 500 prints an object. For example, the object may be part of an electronic device that uses a flexible thin-film battery. The object may have a curved outer surface or some other irregular shape.

At block 506, the method 500 prints a first substrate of the flexible printed battery on an outer surface of the object. The first substrate may be printed using the same material as used to print the object. The first substrate may be printed as an integral part of the object. In other words, the first substrate and the object may be printed as a single unitary piece. Said another way, the object and the first substrate may be printed as part of a single 3D printing process or 3D print instructions executed by the 3D printer. The first substrate may be printed to have a shape that matches the shape of the outer surface of the object. As a result, the first substrate and the subsequent layers of the flexible printed battery may have a smoother and better adhesion to the object.

At block 508, the method 500 prints a first current collector on the first substrate. The first current collector may be printed with a tab portion to provide an area for connection to complete a circuit to the battery.

At block 510, the method 500 prints a first layer on the first current collector. The first layer may be printed to substantially cover the first current collector. In one embodiment, the first current collector and the first layer may be printed via a different printing method than the first substrate. For example, the first current collector and the first layer may be printed via a screen printing operation. In another embodiment, the first substrate, the first current collector and the first layer may be printed using the same printing method (e.g., 3D printing).

In one embodiment, the first substrate, the first current collector, and the first layer may be the cathode. When the first substrate, the first current collector, and the first layer are the cathode, the first current collector may be printed using silver and the first layer may be printed using $MnO_2$.

In one embodiment, the first substrate, the first current collector, and the first layer may be the anode. When the first substrate, the first current collector, and the first layer are the anode, the first current collector may be printed using silver and the first layer may be printed using Zn. In other words, either the cathode or the anode may be printed first.

At block 512, the method 500 prints a second substrate. The second substrate may be printed using the same material as the first substrate that is printed. The second substrate may be printed to have a substantially similar shape as the first substrate.

At block 514, the method 500 prints a second current collector on the second substrate. The second current collector may be printed with a tab portion to provide an area for connection to complete a circuit to the battery.

At block 516, the method 500 prints a second layer on the second current collector. The second layer may be printed to substantially cover the second current collector. In one embodiment, the second current collector and the second layer may be printed via a different printing method than the second substrate. For example, the second current collector and the second layer may be printed via a screen printing operation. In another embodiment, the second substrate, the second current collector and the second layer may be printed using the same printing method (e.g., 3D printing).

In one embodiment, the second substrate, the second current collector, and the second layer may be the anode if the first substrate, the first current collector, and the first layer are the cathode. In one embodiment, the second substrate, the second current collector, and the second layer may be the cathode if the first substrate, the first current collector, and the first layer are the anode.

At block 518, the method 500 couples the second substrate to the first substrate via a thermal bonding process to encapsulate a paper separator membrane moistened with an electrolyte that is in contact with the first layer and the second layer. For example, the paper separator membrane may be positioned between the first substrate and the second substrate and in contact with the first layer and the second layer. The paper separator membrane may be moistened with an electrolyte such as $NH_4Cl$. However, it should be noted that any electrolyte that can be used for batteries may be used.

In one embodiment, the first substrate and the second substrate may be coupled together without using an adhesive or an encapsulant. For example, the first substrate and the second substrate may be coupled via a thermal bonding process. Heat may be applied around the edges of the first substrate and the second substrate to thermally bond the substrate materials together and form a seal around the perimeter or edges of the first substrate and the second substrate.

In one embodiment, a conductive layer or material may be used to cover the tab portions of the first current collector and the second current collector that may still be exposed. The conductive layer may be any type of metal material such as a copper foil. At block 520, the method 500 ends.

It should be noted that the blocks in FIGS. 4 and 5 that recite a determining operation or involve a decision do not necessarily require that both branches of the determining operation be practiced. In other words, one of the branches of the determining operation can be deemed as an optional step. In addition, one or more steps, blocks, functions or operations of the above described methods 400 and 500 may comprise optional steps, or can be combined, separated, and/or performed in a different order from that described above, without departing from the example embodiments of the present disclosure.

Figure 6:
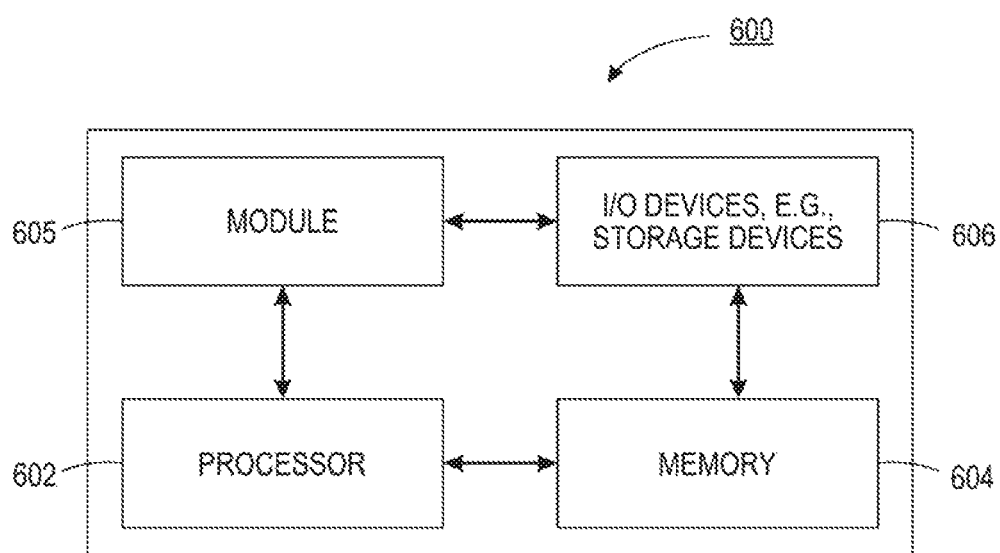
FIG. 6 illustrates a high-level block diagram of a computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for printing a flexible thin-film printed battery, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for printing a flexible thin-film printed battery (e.g., a software program comprising computer-executable instructions) can be loaded into memory 604 and executed by hardware processor element 602 to implement the steps, functions or operations as discussed above in connection with the example methods 400 and 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for printing a flexible thin-film printed battery (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing a flexible thin-film printed battery, comprising:
   printing, via a three-dimensional (3D) printer, a cathode substrate of the flexible thin-film printed battery;
   printing a cathode current collector on the cathode substrate;
   printing a cathode layer on the cathode current collector;
   printing, via the 3D printer, an anode substrate;
   printing an anode current collector on the anode substrate;
   printing an anode layer on the anode current collector; and
   coupling the cathode substrate and the anode substrate around a paper separator membrane moistened with an electrolyte that is in contact with the cathode layer and the anode layer.

2. The method of claim 1, wherein at least one of the cathode substrate or the anode substrate is printed to conform to a shape of a surface of an object that is printed.

3. The method of claim 2, wherein the cathode substrate or the anode substrate is printed as an integral part of the object that is printed.

4. The method of claim 2, wherein the shape of the surface is curved.

5. The method of claim 4, wherein the shape of the surface is convex.

6. The method of claim 1, wherein the coupling the cathode substrate and the anode substrate around the paper separator membrane, further comprises:
   heating the edges to seal the paper separator membrane between the cathode layer and the anode layer.

7. The method of claim 1, further comprising:
   attaching a copper tape to an end of the cathode current collector and to an end of the anode current collector.

8. The method of claim 1, wherein the cathode layer comprises manganese oxide and the anode layer comprises zinc.

9. The method of claim 1, wherein the electrolyte comprises ammonium chloride.

10. The method of claim 1, wherein the coupling is performed via thermal bonding process to encapsulate the paper separator membrane.

\* \* \* \* \*